United States Patent
Slaughter et al.

(10) Patent No.: US 6,215,395 B1
(45) Date of Patent: Apr. 10, 2001

(54) APPARATUS AND METHOD FOR VERIFYING SEATBELT USE IN A MOTOR VEHICLE

(76) Inventors: Ronald Jim Slaughter; Mary Jo Slaughter, both of 2460 Poppy Rd., Gilmer, TX (US) 75644

(*) Notice: Subject to any disclaimer, the term of this patent is extended or adjusted under 35 U.S.C. 154(b) by 0 days.

(21) Appl. No.: 09/357,797

(22) Filed: Jul. 20, 1999

(51) Int. Cl.[7] ............................................. B60Q 1/00
(52) U.S. Cl. ..................... 340/457.1; 340/457; 340/461
(58) Field of Search .......................... 340/457, 457.1, 340/461, 458, 459, 468, 469, 425.5

(56) References Cited

U.S. PATENT DOCUMENTS

| | | |
|---|---|---|
| 3,874,474 | 4/1975 | Quantz . |
| 3,875,556 * | 4/1975 | Beaird ............................ 340/457.1 |
| 3,898,473 | 8/1975 | Ueda et al. . |
| 3,906,441 * | 9/1975 | Andersen et al. ............... 340/457.1 |
| 4,107,645 | 8/1978 | Lewis et al. . |
| 4,849,733 * | 7/1989 | Conigliaro et al. ............. 340/457.1 |
| 5,711,574 * | 1/1998 | Barnes .............................. 340/457.1 |
| 5,714,930 * | 2/1998 | McKinney, Jr. ................. 340/457.1 |

FOREIGN PATENT DOCUMENTS 361009360    1/1986    (JP) .

* cited by examiner

*Primary Examiner*—Jeffery Hofsass
*Assistant Examiner*—Daniel Previl
(74) *Attorney, Agent, or Firm*—Siemens Patent Services LC

(57) ABSTRACT

The present invention provides a system for monitoring the usage of individual vehicular seat belts. Each belt is equipped with a local indicator which is adapted to indicate when a seatbelt is not properly fastened. A second display, preferable near the vehicle's dashboard and readily visible to the driver shows the status of each of the vehicle's seatbelts. Finally, a third display located near the rear the rear window of the vehicle displays the status of all vehicle seatbelts in a fashion readily observable by a following motorist such as a law enforcement official. An optional seat occupancy sensor may also be used to render the system more intelligent and minimize indications of unbuckled seatbelts for unoccupied seats.

11 Claims, 4 Drawing Sheets

APPARATUS AND METHOD FOR VERIFYING SEATBELT USE IN A MOTOR VEHICLE

BACKGROUND OF THE INVENTION

1. Field of the Invention

The present invention relates to a device to encourage the wearing of automobile seatbelts. More particularly, the invention comprises a system of indicators specifically displaying which occupant of a vehicle does not have his or her seat fastened, the indicators being visible outside the vehicle to aid law enforcement agencies in the enforcement of seat belt statutes.

2. Description of the Prior Art

Each year, lives are lost in motor vehicle accidents because one or more occupants were not wearing a seat belt. The advent of air bags and other passive restraint devices has helped this situation but still, air bags in and of themselves do not provide complete protection of the vehicle driver or passenger(s) in the event of a collision. Because of the overwhelming evidence that seatbelts do save lives, many states have passed mandatory seat belt laws with fines for non-compliance. For whatever the reasons, many people still do not "buckle up" before departing in a motor vehicle. Because law enforcement officials have no easy way to insure that all vehicle occupants are wearing seatbelts, there is far too often disregard of the seat belt laws.

Many ideas have been proposed to solve this problem. For example, U.S. Pat. No. 3,874,474 for METHOD AND APPARATUS FOR DETECTING THE UTILIZATION OF A VEHICLE SAFETY BELT; issued Apr. 1, 1975 to Norman G. Quantz, teaches a system for detecting the occupancy of a seat and the state of the seat belt (i.e., buckled or unbuckled). An unspecified signal is presented to a "utilization device". Quantz, however, provides no indication of how many or which seat belts remain unfastened and, in addition, provides no signal visible outside the vehicle indicating that one or more seat belts associated with occupied seats remain unfastened.

In contradistinction, the instant invention provides indicators at each seatbelt buckle showing the status of that particular seatbelt. In addition, signals specifically indicating which seatbelts remain unfastened are provided to both the vehicle driver and, externally, to following motorists, such as law enforcement personnel.

Another seat occupancy sensing system is taught in U.S. Pat. No. 3,898,473 for SENSING SYSTEM FOR SENSING STATE OF WEAR OF SEATBELT; issued Aug. 5, 1975 to Atushi Ueda, et al. The Ueda, et al. system provides for switch contacts within the seat structure for sensing occupancy but still provides no seat-specific information regarding the fastened/unfastened status of individual seat belts.

The inventive system, on the other hand, provides seat-specific information regarding the status of each seatbelt in the vehicle. This information is displayed in a manner observable by a trailing motorist such as a law enforcement officer.

Another approach to the problem of encouraging the wearing of seat belts is disclosed in U.S. Pat. No. 4,107,645 for SEAT BELT SYSTEM WITH STARTER ENGINE LOCK AND ALARM; issued Aug. 15, 1978 to Donald J. Lewis, et al. Lewis et al. teach a system wherein if a vehicle's front seat is occupied but the occupant has not fastened his or her seatbelt, the engine can not be started and, in addition, an alarm is sounded. Lewis et al., however, provide no visual indication of a seatbelt buckle's status either at the buckle, at the driver's region of the dashboard, or at a location viewable from outside the vehicle.

Finally, Japanese Patent No. JP361009360(a) for SETTING CHECKER FOR SEAT BELT, issued January, 1998 to Isuke Hzuka, et al. teaches an indicator lamp outside the vehicle body which is illuminated if a vehicle occupant has not fastened his or her seatbelt. Hzuka et al. do not teach a system indicating which vehicle occupant or occupants do not have their seatbelts fastened, but rather provide a single visual indication outside the vehicle. Neither do they teach the use of individual indicators at each seatbelt buckle.

In each one of these prior art inventions, some form of seatbelt monitoring is disclosed. Some included general indicators which show that at least one seatbelt is not fastened. No combination of this or any other prior art known to the Applicant provides any visual indication of the status of individual seatbelts, either inside or outside the vehicle.

None of the above inventions and patents, taken either singly or in combination, is seen to either describe or render obvious the instant invention as claimed.

SUMMARY OF THE INVENTION

The present invention provides a system for monitoring the status of individual vehicular seat belts. Each belt is equipped with a local indicator which is adapted to indicate when a seatbelt is not properly fastened. A second display, preferably near the vehicle's dashboard and readily visible to the driver shows the status of each of the vehicle's seatbelts. Finally, a third display located in or near the rear window of the vehicle displays the status of all vehicle seatbelts in a fashion readily observable by a following motorist, particularly a law enforcement official.

Accordingly, it is a principal object of the invention to provide a seatbelt usage indicating system wherein each seatbelt buckle is equipped with a local indicator displaying whether or not the buckle is fastened.

It is another object of the invention to provide a seatbelt usage indicating system where the status of each individual seatbelt is displayed within view of the vehicle driver.

It is a further object of the invention to provide a seatbelt usage indicating system wherein the status of each individual seatbelt is displayed in a manner readily viewable from outside the vehicle, specifically by a following motorist or other observer behind the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Generally speaking, the present invention relates to the monitoring of seatbelt usage in a motor vehicle and, more particularly, to a system for monitoring each individual seatbelt and displaying the status of each belt within view of the driver and, in addition, external to the vehicle.

Figure 1:
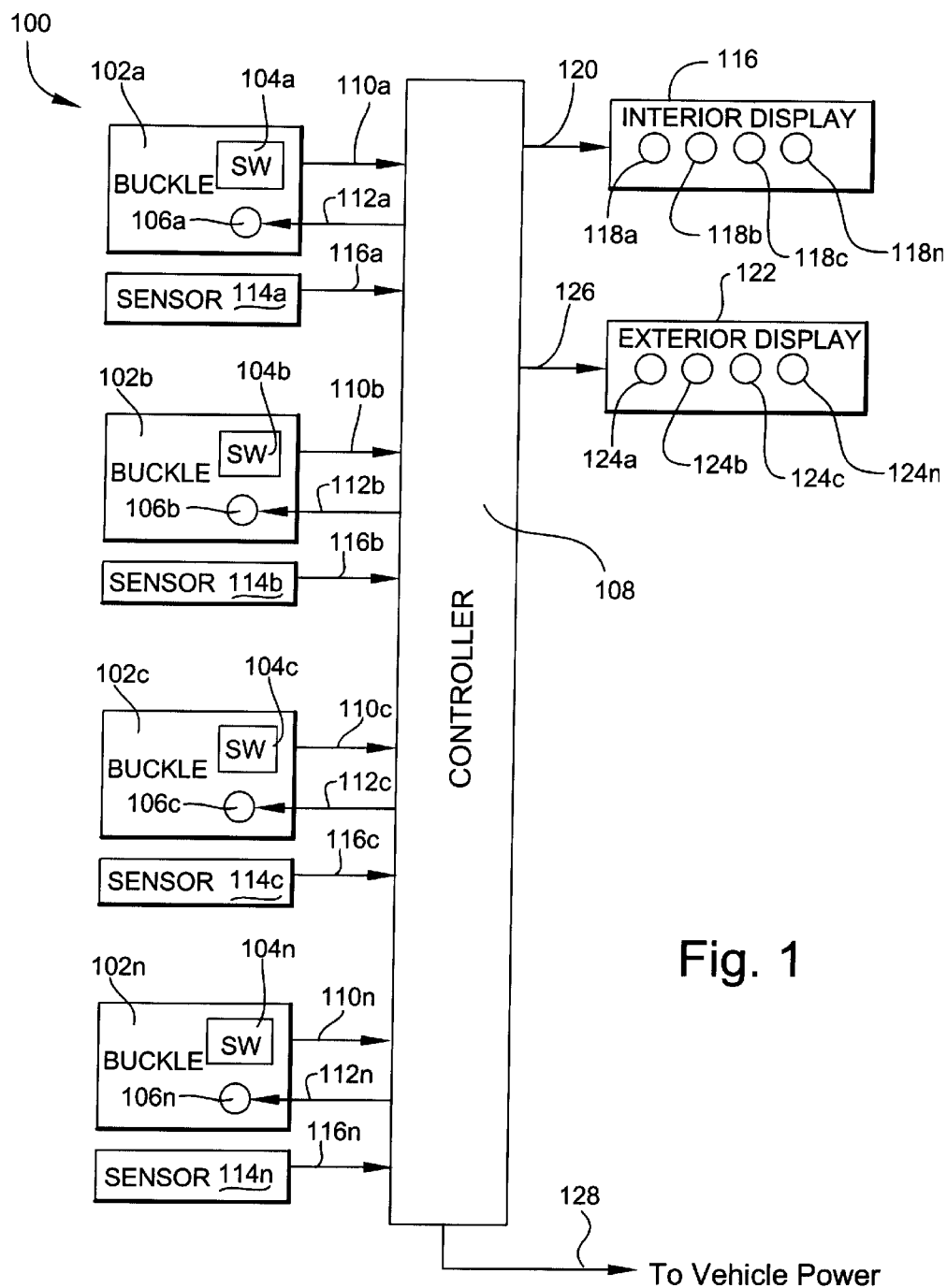
FIG. 1 is a system block diagram of the seatbelt usage display system of the invention.

Referring first to FIG. 1, there is shown a system block diagram, generally at reference number 100. A series of seatbelt buckles 102a, 102b, 102c . . . 102n each contain two functional components: a buckle switch 104a, 104b, 104c . . . 104n and a buckle indicator 106a, 106b, 106c . . . 106n. Note that the terminology 102x, etc. is used herein to refer to any single one of a previously described series of references (i.e., 102a, 102b, 102c . . . 102n). In the inventive system, any number of seatbelt buckles 102x may be monitored although four or five are usually all that are necessary in a passenger automobile. Different numbers will, obviously, be required in different vehicle configurations.

Figure 4:
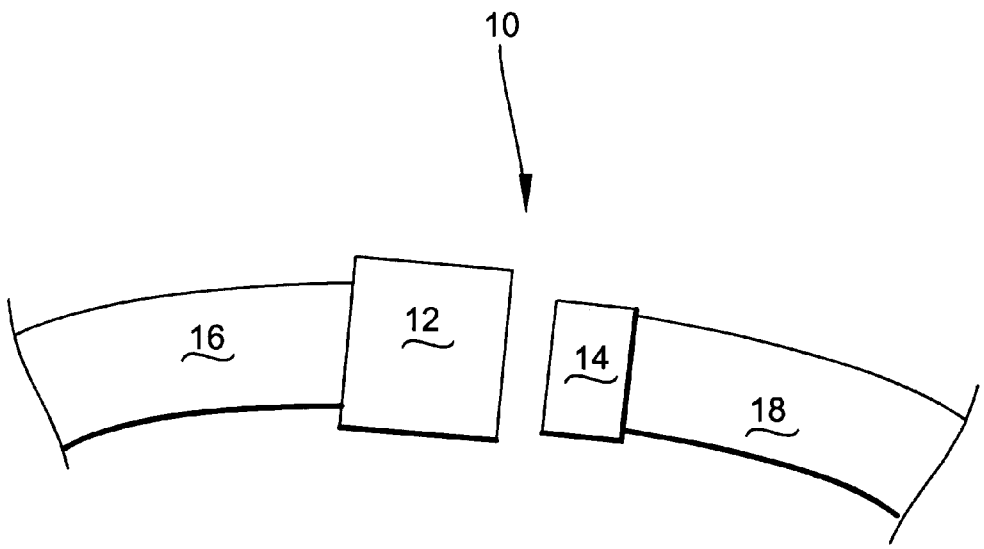
FIG. 4 is a front elevational detail view of a seatbelt buckle shown at the center of FIG. 3.

Each buckle switch 104a, 104b, 104c . . . 104n is connected to controller 108 by switch cable 110a, 110b, 110c . . . 110n, respectively. The switches may be of any type known and used in the automotive industry. The switch may be a single-part switch having all electrical connections in one half of the seatbelt buckle or, in alternate embodiments, may have electrical connections to both halves of the buckle. Buckles 102x are representative of a separable connector 10 (see FIG. 4) including one connector section 12 separably connectable to another connector section 14. Each section 12 or 14 is associated with one end or section 16 or 18 of the seatbelt. Each buckle 102a, 102b, 102c . . . 102n is also equipped with an indicator 106a, 106b, 106c . . . 106n. Cables 110x are general high-reliability flat cables, generally integrally formed into or onto the fabric forming the seatbelt (not shown) itself.

Indicators 106x are designed to indicate the latched status of the buckle 102x to which they are connected. In the embodiment chosen for disclosure, indicators 106 are LEDs, chosen for their low power consumption, long life and low heat production. Many other types of indicators well known to those skilled in the art could readily be adapted for use with the inventive system. The inventive system, therefore, is not considered limited to the LED indicators 106x. Each indicator 106x is also connected to controller 108 by indicator cables 112a, 112b, 112c . . . 112n. Like cables 110x described hereinabove, cables 112x are also high-reliability flat cables, generally integrally formed into or onto the fabric forming the seatbelt (not shown) itself.

Figure 3:
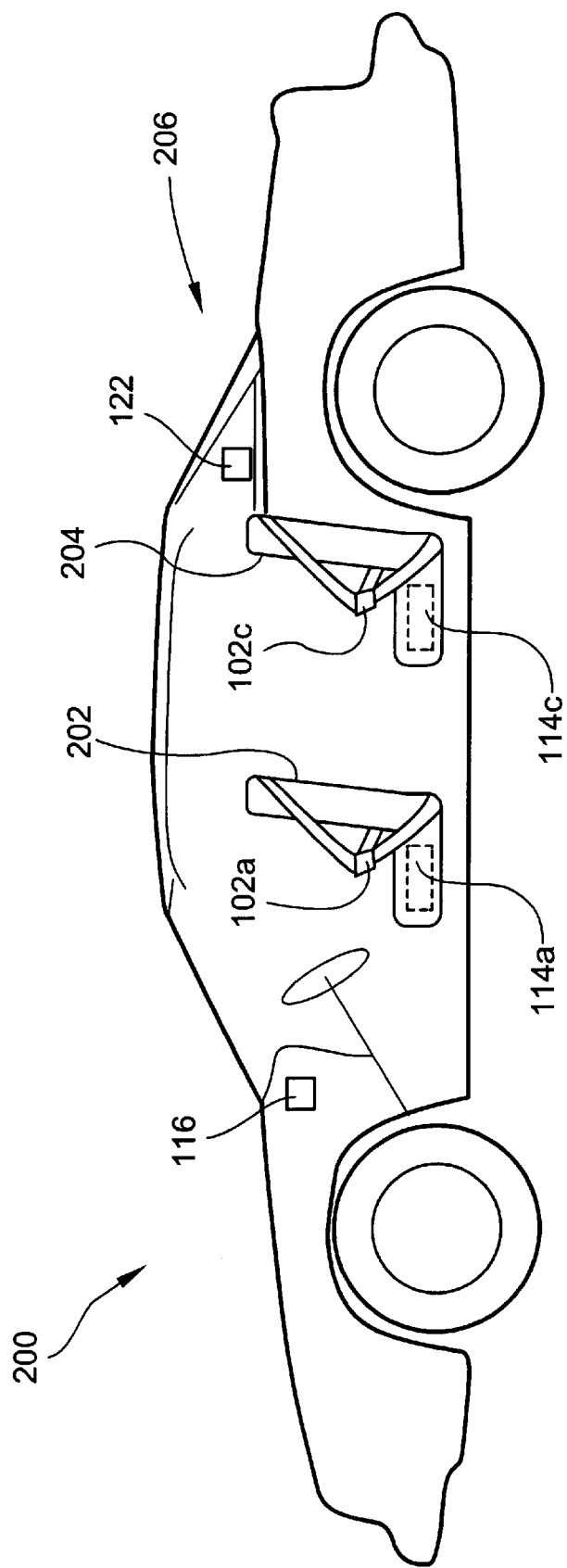
FIG. 3 is a schematic pictorial diagram of a vehicle showing the relative location of the indicators of the seatbelt usage monitoring system of the invention.

Each vehicle seat is also equipped with an occupancy sensor 114a, 114b, 114c . . . 114n. Occupancy sensors 114x may also be any of several type of sensor well know to those skilled in the arts. Typically, sensors 114x will be a pressure-sensitive arrangement integrally formed into the vehicle seat 202, 204 (FIG. 3). The sensitivities of sensors 114x are carefully chosen so that they will respond to an occupant in the seat but be unresponsive to a bag of groceries, a small pet, or other such cargo which may be placed from time to time in the seat. Occupancy sensors 114a, 114b, 114c . . . 114n are also connected to controller 108 by sensor cables 116a, 116b, 116c . . . 116n, respectively. Cables 116x need not be flat cable such as cables 110x or 112x but may be of any type cable suitable for use in an interior vehicular wiring harness.

An interior display console 117 has a series of indicators 118a, 118b, 118c . . . 118n corresponding to buckles 102a, 102b, 102c . . . 102n, respectively. Interior display console 117 is placed where it is readily viewed by the vehicle driver but does not impair the driver's view of the road. Indicators 118x may also be LEDS although a wide variety of other display devices well know to those skilled in the art may also be used. In alternative embodiments, a dimming control 134 (FIG. 2) may be implemented to vary the intensity of indicators 118x as a function of the interior light level in the vehicle (i.e., brighter during daylight hours, dimmer at night, etc.). Dimming control 134 could be implemented either within controller 108 or within interior display console 116. Interior display console 117 is connected to controller 108 by wiring harness 120. Wiring harness 120 may consist of multiple conductors of any type cable suitable for vehicular interior use and may be either multiple single-conductor wires or a multi-conductor cable as best suits the individual circumstance.

Exterior display console 122 is similar to interior display console 117. Exterior console 122 may be mounted either inside the vehicle but in a position where it is readily observed from outside the vehicle or, in alternate embodiments, console 122 may be mounted outside the vehicle in a location such as the trunk deck or the like. Exterior console 122 also has a series of indicators 124a, 124b, 124c . . . 124n corresponding to buckles 102a, 102b, 102c . . . 102n, respectively. Indicators 124x are chosen for their visibility in high ambient light environments such as on a sunny day. Light generating displays may be used or, in alternate embodiments, electromechanically actuated reflective display mechanisms may be used. Exterior console 122 is connected to controller 108 by cable harness 126. Requirements for cable harness 126 are similar to those of cable harness 120 described hereinabove. If exterior display console 122 is physically mounted on the exterior of the vehicle, cable harness 126 must be waterproof and of a type suitable for exterior use.

Controller 108 and subsequently all display devices 106x, 118x, 124x all receive power from the vehicle's electrical system via power connection 126. The operating voltage of controller 108 will generally be 12 volts DC but other voltages such as 24 volts DC may be chosen to fit a particular operating environment or circumstance.

Controller 108 is implemented using either electromechanical relays (not shown), solid-state devices (not shown), or other suitable switching devices (not shown) for performing similar functions. Suitable plug and socket arrangements (not shown) may also be used to connect any combination of cables 110x, 112x, 116x, 120, 126, 128 to controller 108. Alternatively, cables 110x, 112x, 116x, 120, 126, 128 may all be directly connected to appropriate terminals (not shown) within controller 108.

Figure 2:
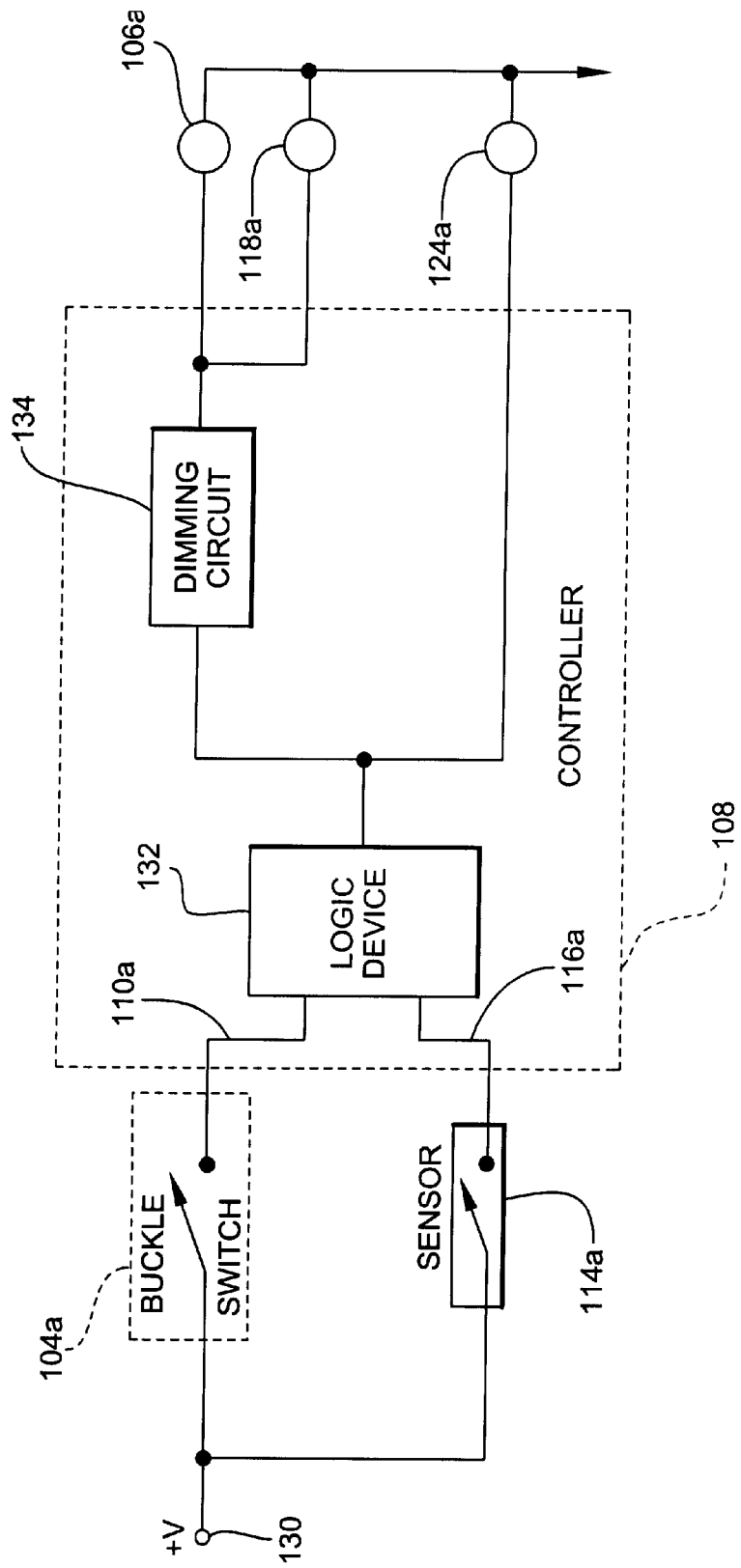
FIG. 2 is an electrical schematic circuit diagram of a portion of the seatbelt usage display system of the invention.

Referring now to FIG. 2, there is shown an electrical schematic diagram of a portion of the circuitry of the inventive seatbelt usage monitoring system. Because the circuitry associated with each monitored seat location in the vehicle is identical, only circuitry for a single seat is shown. A DC voltage from the vehicle's power system is provided at input terminal 130. Input terminal 130 is connected to a first side of buckle switch 104a and to an input side of occupancy sensor 114a. The output side of buckle switch 104a and the output side of occupancy sensor 114a are connected to controller 108 by cables 110a and 116a, respectively. Cables 110a and 116a are ultimately connected to a logic device 132. Logic device 132 is a simple "nand" function implemented in any variety of ways well know to those skilled in the circuit design art. The output of logic device 132 is connected to indicators 106a, 118a and 124a. In alternate embodiments, optional dimming circuit 134 may be interposed between the output of logic device 132 and indicators 106a, 118a because indicators 106a and 118a are both disposed within the vehicle interior and may benefit from the inclusion of optional dimming circuit 134. Indicator 124a disposed for viewing outside the vehicle will generally not require dimming.

Referring now to FIG. 3, there is shown a sectional side view of a typical passenger automobile, generally at reference number 200. Buckles 102a and 102c are shown proximate the driver's front seat 202 and the rear passenger seat 204 behind the driver's seat respectively. Likewise, occupancy sensors 114a and 114c are shown embedded in seats 202 and 204, respectively. Internal display console 116 is shown positioned on or near the dashboard near the driver. Exterior display console 122 is shown on the interior rear ledge immediately behind seat 204 where indicators 124a . . . 124n are clearly visible through vehicle 200 rear window area 206.

In operation, seatbelt buckle switches 204x are closed when their respective seatbelt buckles 202x are properly fastened. If an associated occupancy sensor 114x indicates that a person is seated in the seat and the respective seatbelt switch 104X indicates that the belt is properly fastened, logic device 132 produces no active output. If however, occupancy sensor 114x indicates that a person is seated in the seat but buckle switch 104x indicates that the seatbelt is not properly fastened, the logic device 132 produces an active output. The active output from logic device 132 illuminates the three indicators 106x, 118x 124x associated with that particular seat position.

It is possible to implement the inventive tri-sensor seat belt usage display system without the occupancy sensors 114. This system suffers in that an unoccupied seat will produce a bogus indication of an unfastened seatbelt.

It is to be understood that the present invention is not limited to the embodiments described above, but encompasses any and all embodiments within the scope of the following claims.

I claim:

1. Apparatus for monitoring seatbelt usage in a motor vehicle, wherein the motor vehicle has at least one seat, said apparatus comprising:

at least one seatbelt having a first end and a second end and a separable connector therebetween, said separable connector having a separate, unfastened state and a fastened state, a switch operatively connected to said separable connector for producing unique outputs representative of said separated state and of said unseparated state, an occupancy sensor disposed to sense occupancy of the seat and to avoid responding to pressures less than those associated with human occupants;

at least one first indicator located proximate said separable connector, at least one second indicator located proximate a driver of said vehicle, and at least one third indicator located proximate a rear portion of said vehicle and disposed to be visible from outside said vehicle, wherein said first indicator, said second indicator, and said third indicator are each operatively connected to said switch and to said occupancy sensor such that when said seatbelt is in a separated, unfastened state and the associated seat has a human occupant, each one of said first, second and third indicators produces an output.

2. The apparatus for monitoring seatbelt usage in a motor vehicle as recited in claim 1, wherein each passenger seat of the vehicle comprises a seatbelt and a separable connector, wherein each separable connector has a said switch connected thereto.

3. The apparatus for monitoring seatbelt usage in a motor vehicle as recited in claim 2, wherein said first indicator comprises a visual indicator element.

4. The apparatus for monitoring seatbelt usage in a motor vehicle as recited in claim 3, wherein said visual indicator comprises an LED.

5. The apparatus for monitoring seatbelt usage in a motor vehicle as recited in claim 3, wherein said second indicator and said third indicator each comprise a group of visual indicator elements, each one of said group of visual indicator elements being uniquely associated with a corresponding said separable connector and adapted to indicate the fastened and unfastened states of said corresponding separable connectors.

6. The apparatus for monitoring seatbelt usage in a motor vehicle as recited in claim 5, wherein said second indicating means is located proximate a driver of said vehicle and visible to said driver.

7. The apparatus for monitoring seatbelt usage in a motor vehicle as recited in claim 5, wherein said third indicating means is located proximate a rear portion of said vehicle and is visible from a position external to and behind said vehicle.

8. The apparatus for monitoring seatbelt usage in a motor vehicle as recited in claim 5, wherein said second indicator and said third indicator each comprises a group of visual indicator elements, each one of said group of visual indicator elements being uniquely associated with a corresponding seatbelt and adapted to indicate the fastened and unfastened state of said corresponding seatbelt.

9. The apparatus for monitoring seatbelt usage in a motor vehicle as recited in claim 2, wherein said second indicator and said third indicator each comprise a group of visual indicator elements, each one of said group of visual indicator elements being uniquely associated with a corresponding said separable connector and is adapted to indicate the fastened and unfastened states of said corresponding separable connectors.

10. The apparatus for monitoring seatbelt usage in a motor vehicle as recited in claim 9, further comprising a dimming circuit disposed to dim said second indicator responsive to interior light level in said vehicle.

11. The apparatus for monitoring seatbelt usage in a motor vehicle as recited in claim 2, wherein said first indicator, said second indicator, and said third indicator each are operatively connected to each said switch such that when each separable connector is in a fastened state each of said first indicator, said second indicator, and said third indicator produces an output.

* * * * *